US011638880B2

(12) United States Patent
Lee

(10) Patent No.: US 11,638,880 B2
(45) Date of Patent: May 2, 2023

(54) METHOD AND SYSTEM FOR MANAGING TEAM BY AUTOMATICALLY RECOMMENDING POSITION AND TRAINER FOR PLAYER IN SPORTS GAME

(71) Applicant: GAMEVIL INC., Seoul (KR)

(72) Inventor: Dong Won Lee, Seoul (KR)

(73) Assignee: GAMEVIL INC., Seoul (KR)

(*) Notice: Subject to any disclaimer, the term of this patent is extended or adjusted under 35 U.S.C. 154(b) by 179 days.

(21) Appl. No.: 16/876,891

(22) Filed: May 18, 2020

(65) Prior Publication Data
US 2020/0376392 A1 Dec. 3, 2020

(30) Foreign Application Priority Data

Jun. 3, 2019 (KR) .................. 10-2019-0065193

(51) Int. Cl.
*A63F 13/828* (2014.01)
*A63F 13/58* (2014.01)
*A63F 13/60* (2014.01)

(52) U.S. Cl.
CPC ............ *A63F 13/828* (2014.09); *A63F 13/58* (2014.09); *A63F 13/60* (2014.09); *A63F 2300/8052* (2013.01)

(58) Field of Classification Search
CPC ........ A63F 13/828; A63F 13/58; A63F 13/60; A63F 2300/8052
See application file for complete search history.

(56) References Cited

U.S. PATENT DOCUMENTS

2002/0151365 A1* 10/2002 Walker .................... G07F 17/32
463/42
2019/0329139 A1* 10/2019 Di Giacomo Toledo ....................
A63F 13/67

FOREIGN PATENT DOCUMENTS

KR 10-2012-000077538 B1 7/2012
KR 10-2013-0139400 B1 12/2013
KR 10-2013-0082956 B1 1/2014
(Continued)

OTHER PUBLICATIONS

Park Myung-Gi, "The best management game I am!", Gametoc,< http://www.gametoc.co.kr/news/articlePrint.html?idxno=5715>, retrieved Sep. 23, 2020, 17 pages.
(Continued)

*Primary Examiner* — Thomas H Henry
(74) *Attorney, Agent, or Firm* — Christensen O'Connor Johnson Kindness PLLC

(57) ABSTRACT

Disclosed are a method and system for managing a team by automatically recommending a position and trainer for a player in a sports game. The method may include processing the progress of a sports game instance for a user team in which at least one player character assigned to a user participates in a sports game, generating a game record including record values according to the progress of a game for each position and for each record item in the sports game with respect to the sports game instance performed on the user team, extracting at least one of the record items of the sports game as a vulnerable element of the user team based on the game record, determining a vulnerable position based on the at least one record item extracted as the vulnerable element of the user team, and providing information on the vulnerable position.

7 Claims, 17 Drawing Sheets

(56) References Cited

FOREIGN PATENT DOCUMENTS

KR    10-2016-0149981  B1    12/2016

OTHER PUBLICATIONS

Office Action dated Oct. 20, 2020, in corresponding Korean application No. 10-2019-0065193 (Korean version), filed Jun. 3, 2019, 6 pages.

* cited by examiner

| Data | BatterRecord | | | | | | | | | | | |
|---|---|---|---|---|---|---|---|---|---|---|---|---|
| Position | Hit | | Home run | | Run batted in | | Stolen base | | Good defense | | Mistake | |
| position | type1 | value1 | type2 | value2 | type3 | value3 | type4 | value4 | type5 | value5 | type6 | value6 |
| C | HT | 98 | HR | 6 | RBI | 6 | SB | 2 | GD | 6 | MS | 5 |
| 1B | HT | 91 | HR | 6 | RBI | 25 | SB | 1 | GD | 7 | MS | 25 |
| 2B | HT | 47 | HR | 7 | RBI | 15 | SB | 0 | GD | 5 | MS | 9 |
| 3B | HT | 89 | HR | 3 | RBI | 28 | SB | 3 | GD | 9 | MS | 22 |
| SS | HT | 53 | HR | 4 | RBI | 19 | SB | 0 | GD | 10 | MS | 12 |
| LF | HT | 19 | HR | 13 | RBI | 16 | SB | 3 | GD | 15 | MS | 0 |
| CF | HT | 46 | HR | 10 | RBI | 13 | SB | 3 | GD | 14 | MS | 19 |
| RF | HT | 28 | HR | 5 | RBI | 6 | SB | 5 | GD | 10 | MS | 13 |

FIG. 5

| Data | PitcherRecord | | | | | | | | | |
|---|---|---|---|---|---|---|---|---|---|---|
| Position | Lose point | | Allowed hit | | Allowed home run | | Strike out | | Four ball | |
| position | type1 | value1 | type2 | value2 | type3 | value3 | type4 | value4 | type5 | value5 |
| SP | LP | 10 | AHT | 15 | AHR | 4 | SOT | 8 | FB | 7 |
| RP | LP | 1 | AHT | 49 | AHR | 10 | SOT | 16 | FB | 4 |
| CP | LP | 3 | AHT | 33 | AHR | 8 | SOT | 0 | FB | 2 |

FIG. 6

| Data type | BatterReport memo | total | average | ratio |
|---|---|---|---|---|
| HT | Hit | 471 | 23.6 | 18.5 |
| HR | Home run | 54 | 2.7 | 87.1 |
| RBI | Run batted in | 128 | 6.4 | 17.2 |
| SB | Stolen base | 17 | 0.9 | 27.9 |
| GD | Good defense | 76 | 3.8 | 21.7 |
| MS | Mistake | 105 | 5.3 | 45.6 |

FIG. 7

| Data type | PitcherReport | | | |
|---|---|---|---|---|
| | memo | total | average | ratio |
| LP | Lose point | 14 | 0.7 | 12.0 |
| AHT | Allowed hit | 97 | 4.9 | 61.2 |
| AHR | Allowed home run | 22 | 1.1 | 29.1 |
| SOT | Strike out | 24 | 1.2 | 99.0 |
| FB | Four ball | 13 | 0.7 | 23.4 |

FIG. 8

| Data | WeaknessOrder | | |
|---|---|---|---|
| type | memo | ratio | criterion |
| HT | Hit | 18.5 | P |
| HR | Home run | 87.1 | P |
| RBI | Run batted in | 17.2 | P |
| SB | Stolen base | 27.9 | P |
| GD | Good defense | 21.7 | P |
| MS | Mistake | 45.6 | N |
| LP | Lose point | 12.0 | N |
| AHT | Allowed hit | 61.2 | N |
| AHR | Allowed home run | 29.1 | N |
| SOT | Strike out | 99.0 | P |
| FB | Four ball | 23.4 | N |

810

⇒

| type | ratio |
|---|---|
| HT | 18.5 |
| HR | 87.1 |
| RBI | 17.2 |
| SB | 27.9 |
| GD | 21.7 |
| MS | 54.4 |
| LP | 88.0 |
| AHT | 38.8 |
| AHR | 70.9 |
| SOT | 99.0 |
| FB | 76.6 |

820

⇒

| type | ratio | order |
|---|---|---|
| SOT | 99.0 | 1 |
| LP | 88.0 | 2 |
| HR | 87.1 | 3 |
| FB | 76.6 | 4 |
| AHR | 70.9 | 5 |
| MS | 54.4 | 6 |
| AHT | 38.8 | 7 |
| SB | 27.9 | 8 |
| GD | 21.7 | 9 |
| HT | 18.5 | 10 |
| RBI | 17.2 | 11 |

| Data | PitcherRecord | |
|---|---|---|
| Position | Strike out | |
| position | type4 | value4 |
| SP | SOT | 8 |
| RP | SOT | 16 |
| CP | SOT | 0 |

| Data | Batter_Type_2ndStat_Correlation | | | | | | | | | | | | | | |
|---|---|---|---|---|---|---|---|---|---|---|---|---|---|---|---|
| type | memo | Hit increase | | Home run long hit increase | | Home run increase | | Bat control | | Moving speed | | Ability to throw ball | | Ability to catch ball | |
| type | memo | type1 | value1 | type2 | value2 | type3 | value3 | type4 | value4 | type5 | value5 | type6 | value6 | type7 | value7 |
| HT | Hit | ATG | 5 | JTG | 4 | HRG | 3 | BCT | 2 | MVC | 1 | SGC | 0 | PGC | 0 |
| HR | Home run | ATG | 4 | JTG | 3 | HRG | 5 | BCT | 2 | MVC | 1 | SGC | 0 | PGC | 0 |
| RBI | Run batted in | ATG | 5 | JTG | 4 | HRG | 3 | BCT | 2 | MVC | 1 | SGC | 0 | PGC | 0 |
| SB | Stolen base | ATG | 4 | JTG | 3 | HRG | 2 | BCT | 1 | MVC | 5 | SGC | 0 | PGC | 0 |
| GD | Good defense | ATG | 0 | JTG | 0 | HRG | 1 | BCT | 2 | MVC | 3 | SGC | 5 | PGC | 4 |
| MS | Mistake | ATG | 0 | JTG | 0 | HRG | 1 | BCT | 2 | MVC | 3 | SGC | 4 | PGC | 5 |

FIG. 12

| Data | Pitcher_Type_2ndStat_Correlation | | | | | | | | | | | |
|---|---|---|---|---|---|---|---|---|---|---|---|---|
| type | memo | Ball speed | | Ball control | | Hit decrease | | Home run long hit decrease | | Home run decrease | | Stamina | |
| type | memo | type1 | value1 | type2 | value2 | type3 | value3 | type4 | value4 | type5 | value5 | type6 | value6 |
| LP | Lose point | GS | 1 | JG | 2 | ATS | 3 | JTS | 4 | HRS | 5 | STM | 1 |
| AHT | Allowed hit | GS | 1 | JG | 2 | ATS | 5 | JTS | 4 | HRS | 3 | STM | 1 |
| AHR | Allowed home run | GS | 1 | JG | 1 | ATS | 3 | JTS | 4 | HRS | 5 | STM | 2 |
| SOT | Strike out | GS | 4 | JG | 5 | ATS | 3 | JTS | 2 | HRS | 1 | STM | 1 |
| FB | Four ball | GS | 4 | JG | 5 | ATS | 1 | JTS | 1 | HRS | 2 | STM | 3 |

FIG. 13

| Data | Batter_2ndStat_1stStat_Correlation | | | | | | | | |
|---|---|---|---|---|---|---|---|---|---|
| type | memo | Intelligence | | Agility | | Muscular strength | | Mind | |
| type | memo | type1 | value1 | type2 | value2 | type3 | value3 | type4 | value4 |
| ATG | Hit increase | INT | 5 | DEX | 3 | STR | 0 | MEN | 0 |
| JTG | Long hit increase | INT | 3 | DEX | 0 | STR | 5 | MEN | 0 |
| HRG | Home run increase | INT | 0 | DEX | 0 | STR | 5 | MEN | 3 |
| BCT | Bat control | INT | 5 | DEX | 0 | STR | 0 | MEN | 3 |
| MVC | Moving speed | INT | 5 | DEX | 3 | STR | 0 | MEN | 0 |
| SGC | Ability to throw ball | INT | 0 | DEX | 0 | STR | 5 | MEN | 3 |
| PGC | Ability to catch ball | INT | 0 | DEX | 5 | STR | 0 | MEN | 3 |

FIG. 14

| Data type | Pitcher_2ndStat_1stStat_Correlation | | | | | | | | |
|---|---|---|---|---|---|---|---|---|---|
| | memo | Intelligence | | Agility | | Muscular strength | | Mind | |
| type | memo | type1 | value1 | type2 | value2 | type3 | value3 | type4 | value4 |
| GS | Ball speed | INT | 0 | DEX | 3 | STR | 5 | MEN | 0 |
| JG | Ball control | INT | 5 | DEX | 3 | STR | 0 | MEN | 0 |
| ATS | Hit decrease | INT | 5 | DEX | 0 | STR | 0 | MEN | 3 |
| JTS | Home run long hit decrease | INT | 0 | DEX | 3 | STR | 5 | MEN | 0 |
| HRS | Home run decrease | INT | 5 | DEX | 0 | STR | 0 | MEN | 3 |
| STM | Stamina | INT | 0 | DEX | 0 | STR | 5 | MEN | 3 |

| Batter_Type_1stStat_Correlation |
|---|
| Hit_Intelligence = (5,4,3,2,1,0,0) X (5,3,0,5,5,0,0) = 52 |
| Hit_Agility = (5,4,3,2,1,0,0) X (3,0,0,0,3,0,5) = 18 |
| Hit_Muscular strength = (5,4,3,2,1,0,0) X (0,5,5,0,0,5,0) = 35 |
| Hit_Mind= (5,4,3,2,1,0,0) X (0,0,3,3,0,3,3) = 15 |
| Home run_Intelligence = (4,3,5,2,1,0,0) X (5,3,0,5,5,0,0) = 44 |
| Home run_Agility = (4,3,5,2,1,0,0) X (3,0,0,0,3,0,5) = 15 |
| Home run_Muscular strength = (4,3,5,2,1,0,0) X (0,5,5,0,0,5,0) = 40 |
| Home run_Mind= (4,3,5,2,1,0,0) X (0,0,3,3,0,3,3) = 21 |
| Run batted in_Intelligence = (5,4,3,2,1,0,0) X (5,3,0,5,5,0,0) = 52 |
| Run batted in_Agility = (5,4,3,2,1,0,0) X (3,0,0,0,3,0,5) = 18 |
| Run batted in_Muscular strength = (5,4,3,2,1,0,0) X (0,5,5,0,0,5,0) = 35 |
| Run batted in_Mind= (5,4,3,2,1,0,0) X (0,0,3,3,0,3,3) = 15 |
| Stolen base_Intelligence = (4,3,2,1,5,0,0) X (5,3,0,5,5,0,0) = 59 |
| Stolen base_Agility = (4,3,2,1,5,0,0) X (3,0,0,0,3,0,5) = 27 |
| Stolen base_Muscular strength = (4,3,2,1,5,0,0) X (0,5,5,0,0,5,0) = 25 |
| Stolen base_Mind= (4,3,2,1,5,0,0) X (0,0,3,3,0,3,3) = 09 |
| Good defense_Intelligence = (0,0,1,2,3,5,4) X (5,3,0,5,5,0,0) = 25 |
| Good defense_Agility = (0,0,1,2,3,5,4) X (3,0,0,0,3,0,5) = 29 |
| Good defense_Muscular strength = (0,0,1,2,3,5,4) X (0,5,5,0,0,5,0) = 30 |
| Good defense_Mind= (0,0,1,2,3,5,4) X (0,0,3,3,0,3,3) = 36 |
| Mistake_Intelligence = (0,0,1,2,3,4,5) X (5,3,0,5,5,0,0) = 25 |
| Mistake_Agility = (0,0,1,2,3,4,5) X (3,0,0,0,3,0,5) = 34 |
| Mistake_Muscular strength = (0,0,1,2,3,4,5) X (0,5,5,0,0,5,0) = 25 |
| Mistake_Mind= (0,0,1,2,3,4,5) X (0,0,3,3,0,3,3) = 36 |

FIG. 16

| Pitcher_Type_1stStat_Correlation |
|---|
| Lose point_Intelligence = (1,2,3,4,5,1) X (0,5,5,0,5,0) = 50 |
| Lose point_Agility = (1,2,3,4,5,1) X (3,3,0,3,0,0) = 21 |
| Lose point_Muscular strength = (1,2,3,4,5,1) X (5,0,0,5,0,5) = 30 |
| Lose point_Mind= (1,2,3,4,5,1) X (0,0,3,0,3,3) = 27 |
| Allowed hit_Intelligence = (1,2,5,4,3,1) X (0,5,5,0,5,0) = 50 |
| Allowed hit_Agility = (1,2,5,4,3,1) X (3,3,0,3,0,0) = 21 |
| Allowed hit_Muscular strength = (1,2,5,4,3,1) X (5,0,0,5,0,5) = 30 |
| Allowed hit_Mind= (1,2,5,4,3,1) X (0,0,3,0,3,3) = 27 |
| Allowed home run_Intelligence = (1,1,3,4,5,2) X (0,5,5,0,5,0) = 45 |
| Allowed home run_Agility = (1,1,3,4,5,2) X (3,3,0,3,0,0) = 18 |
| Allowed home run_Muscular strength = (1,1,3,4,5,2) X (5,0,0,5,0,5) = 35 |
| Allowed home run_Mind= (1,1,3,4,5,2) X (0,0,3,0,3,3) = 30 |
| Strike out_Intelligence = (4,5,3,2,1,1) X (0,5,5,0,5,0) = 45 |
| Strike out_Agility = (4,5,3,2,1,1) X (3,3,0,3,0,0) = 33 |
| Strike out_Muscular strength = (4,5,3,2,1,1) X (5,0,0,5,0,5) = 35 |
| Strike out_Mind= (4,5,3,2,1,1) X (0,0,3,0,3,3) = 15 |
| Four ball_Intelligence = (4,5,1,1,2,3) X (0,5,5,0,5,0) = 40 |
| Four ball_Agility = (4,5,1,1,2,3) X (3,3,0,3,0,0) = 30 |
| Four ball_Muscular strength = (4,5,1,1,2,3) X (5,0,0,5,0,5) = 41 |
| Four ball_Mind= (4,5,1,1,2,3) X (0,0,3,0,3,3) = 18 |

| Data | P_Factor | | |
|---|---|---|---|
| Primary stat | Memo | type | Coefficient |
| 1stStat | memo | type | value |
| STR | Muscular strength | Muscular strength training deployment probability increase | 10 |
| STR | Muscular strength | Muscular strength training success rate increase | 10 |
| DEX | Agility | Agility training deployment probability increase | 10 |
| DEX | Agility | Agility training success rate increase | 10 |
| INT | Intelligence | Intelligence training deployment probability increase | 10 |
| INT | Intelligence | Intelligence training success rate increase | 10 |
| MEN | Mind | Mind training deployment probability increase | 10 |
| MEN | Mind | Mind training success rate increase | 10 |

METHOD AND SYSTEM FOR MANAGING TEAM BY AUTOMATICALLY RECOMMENDING POSITION AND TRAINER FOR PLAYER IN SPORTS GAME

CROSS REFERENCE TO RELATED APPLICATION

This application is based on and claims priority under 35 U.S.C. 119 to Korean Patent Application No. 10-2019-0065193, filed on Jun. 3, 2019, in the Korean Intellectual Property Office, the disclosures of which is herein incorporated by reference in their entireties.

BACKGROUND OF THE INVENTION

Field of the Invention

The following description relates to a method and system for managing a team by automatically recommending a position and trainer for a player in a sports game.

Related Art

A sports game is a game using sports, such as baseball, soccer or basketball, as a subject matter, and is divided into an action game genre and a simulation game genre. However, the sports game itself tends to be classified as a separate genre. In such a sports game, there are multiple characters that perform a corresponding sports event. From the viewpoint of a given user, it is necessary to select characters that belong to characters assigned to the user and that will be on from the start in a specific sports game instance to be performed by the user. For example, in a baseball game, it is necessary to form 9 players, in other words, a team configured with 9 characters. In this case, the characters in one team may have positions depending on the type of a sports game. For example, in a baseball game, positions, such as a pitcher, a catcher, a center field and a left fielder, may be present.

In most of sports games, at least one status related to the progress of a game is set in each of characters. The status of the character may be a fixed value, but may be changed depending on the game. Particularly, in some games, users can promote their player characters in order to improve the statuses of the player characters. For example, Korean Patent Application Laid-Open No. 10-2013-0082956 relates to a system and method for managing tactics in an online sport simulation game and a recording medium thereof, and discloses that a player character belonging to his or her team can be promoted.

SUMMARY OF THE INVENTION

Provided are a method of managing a team, wherein a vulnerable position within a team can be determined by analyzing user data for a sports game and a suggestion can be made to the user, a computer apparatus performing the method, a computer program stored in a computer-readable recording medium in order to execute the method in a computer apparatus in association with the computer apparatus, and a recording medium therefor.

Provided are a method of managing a team, wherein at least one trainer effective to overcome a vulnerable element is determined and suggested to a user, a computer apparatus performing the method, a computer program stored in a computer-readable recording medium in order to execute the method in a computer apparatus in association with the computer apparatus, and a recording medium therefor.

In an embodiment, a method of managing a team, which is performed by a computer apparatus including at least one processor includes processing, by the at least one processor, the progress of a sports game instance for a user team in which at least one player character assigned to a user participates in a sports game, generating, by the at least one processor, a game record including record values according to the progress of a game for each position in the sports game and for each record item in the sports game with respect to the sports game instance performed on the user team, extracting, by the at least one processor, at least one of the record items of the sports game as a vulnerable element of the user team based on the game record, determining, by the at least one processor, a vulnerable position based on the at least one record item extracted as the vulnerable element of the user team, and providing, by the at least one processor, information on the vulnerable position.

According to one aspect, extracting the at least one record item as the vulnerable element of the user team may include calculating an average record value for each record item based on game records for N sports game instances (N is a natural number) recently performed by the user team, calculating, for each record item, a ratio indicating that the calculated average record value belongs to a top few percent among all teams, and determining at least one record item as the vulnerable element of the user team based on the ratio calculated for each record item.

According to another aspect, determining the vulnerable position may include checking positions associated with the at least one record item extracted as the vulnerable element of the user team, and selecting, as the vulnerable position, at least one of the checked positions based on a record value of the at least one record item extracted as the vulnerable element of the user team.

According to yet another aspect, providing the information on the vulnerable position further may include providing information on the at least one record item extracted as the vulnerable element of the user team and information on positions associated with the at least one record item.

According to yet another aspect, the method of managing a team may further include determining, by the at least one processor, at least one trainer character to be suggested to improve the extracted vulnerable element of the user team in response to a user request associated with the provision of information on the vulnerable position.

According to yet another aspect, determining the at least one trainer character may include calculating a third correlation between the record items of the sports game and items of a primary stat of player characters assigned to the user based on a first correlation between the record items of the sports game and items of a secondary stat of player characters assigned to the user and a second correlation between the items of the secondary stat and the items of the primary stat, calculating a level of contribution to the items of the primary stat of the trainer characters assigned to the user, and selecting at least one trainer character to be suggested to improve the vulnerable element of the user team among the trainer characters assigned to the user based on the calculated third correlation and the calculated level of contribution.

According to yet another aspect, calculating the level of contribution may include calculating the level of contribution based on at least one of a status value of a trainer character, a coefficient present with respect to a status of the trainer character, and an additional point based on whether the vulnerable position and a position of the trainer character are identical with respect to each of the trainer characters assigned to the user.

In an embodiment, there is provided a non-transitory processor-readable medium having instructions stored thereon, which when executed by one or more processors, cause the one or more processors to implement the method In an embodiment, there is provided a computer apparatus including at least one processor implemented to execute instructions readable in a computer. The at least one processor is configured to process the progress of a sports game instance for a user team in which at least one player character assigned to a user participates in a sports game, generate a game record including record values according to the progress of a game for each position in the sports game and for each record item in the sports game with respect to the sports game instance performed on the user team, extract at least one of the record items of the sports game as a vulnerable element of the user team based on the game record, determine a vulnerable position based on the at least one record item extracted as the vulnerable element of the user team, and provide information on the vulnerable position.

BRIEF DESCRIPTION OF THE DRAWINGS

FIG. 4 is a diagram illustrating an example of the game records of batters in a baseball game in an embodiment of the present disclosure.

FIG. 5 is a diagram illustrating an example of the game records of pitchers in a baseball game in an embodiment of the present disclosure.

FIG. 6 is a diagram illustrating an example of statistical information of a batter in a baseball game in an embodiment of the present disclosure.

FIG. 7 is a diagram illustrating an example of statistical information of a pitcher in a baseball game in an embodiment of the present disclosure.

FIG. 8 is a diagram illustrating an example of a process of extracting a vulnerable element in an embodiment of the present disclosure.

FIG. 9 is a diagram for describing an example of a process of determining a vulnerable position in an embodiment of the present disclosure.

FIG. 11 is a diagram illustrating an example of a first correlation between record items and the items of a secondary stat from a batter viewpoint in an embodiment of the present disclosure.

FIG. 12 is a diagram illustrating an example of a first correlation between record items and the items of a secondary stat from a pitcher viewpoint in an embodiment of the present disclosure.

FIG. 13 is a diagram illustrating an example of a second correlation between the items of a secondary stat and the items of a primary stat from a batter viewpoint in an embodiment of the present disclosure.

FIG. 14 is a diagram illustrating an example of a second correlation between the items of a secondary stat and the items of a primary stat from a pitcher viewpoint in an embodiment of the present disclosure.

FIG. 15 and FIG. 16 are diagrams illustrating an example of a third correlation between record items and the items of a primary stat in an embodiment of the present disclosure.

FIG. 17 is a diagram illustrating an example of the status items of a trainer character in an embodiment of the present disclosure.

DESCRIPTION OF EXEMPLARY EMBODIMENTS

Hereinafter, embodiments are described in detail with reference to the accompanying drawings.

A method of managing a team according to various embodiments of the present disclosure may be implemented by at least one computer apparatus. A computer program according to an embodiment of the disclosure may be installed and driven in the computer apparatus. The computer apparatus may perform the method of managing a team according to an embodiment of the disclosure under the control of a driven computer program. The computer program may be stored in a computer-readable recording medium coupled to the computer apparatus in order to execute the method of managing a team in the computer apparatus.

Figure 1:
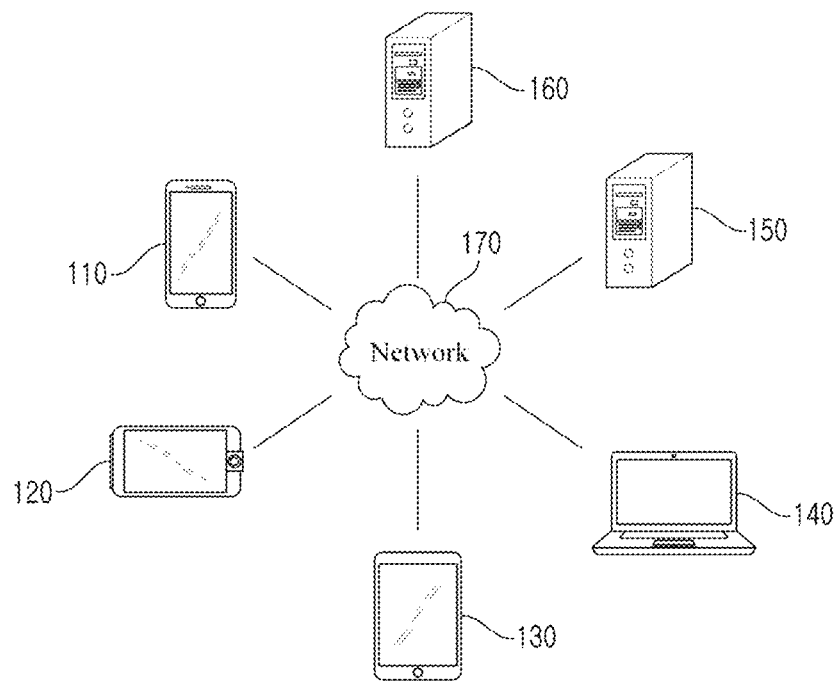
FIG. 1 is a diagram illustrating an example of a network environment according to an embodiment of the present disclosure.

FIG. 1 is a diagram illustrating an example of a network environment according to an embodiment of the present disclosure. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer apparatuses. For example, the plurality of electronic devices 110, 120, 130 and 140 may include a smartphone, a mobile phone, a navigator, a computer, a laptop, a terminal for digital broadcasting, a personal digital assistant (PDA), a portable multimedia player (PMP), and a tablet PC. For example, in FIG. 1, an example of a shape of the electronic device 1 (110) is illustrated as being a smartphone. However, in embodiments of the present disclosure, the electronic device 1 (110) may mean one of various physical computer apparatuses capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer apparatus or a plurality of computer apparatuses, which provides a command, code, a file, content, or a service through communication with the plurality of electronic devices 110, 120, 130 and 140 over the network 170. For example, the server 150 may be a system that provides a service (e.g., a game service, a messaging service, a mail service, a social network service, a map service, a translation service, a financial service, a settlement service, a search service, or a content provision service) to the plurality of electronic devices 110, 120, 130 and 140 connected thereto over the network 170.

Figure 2:
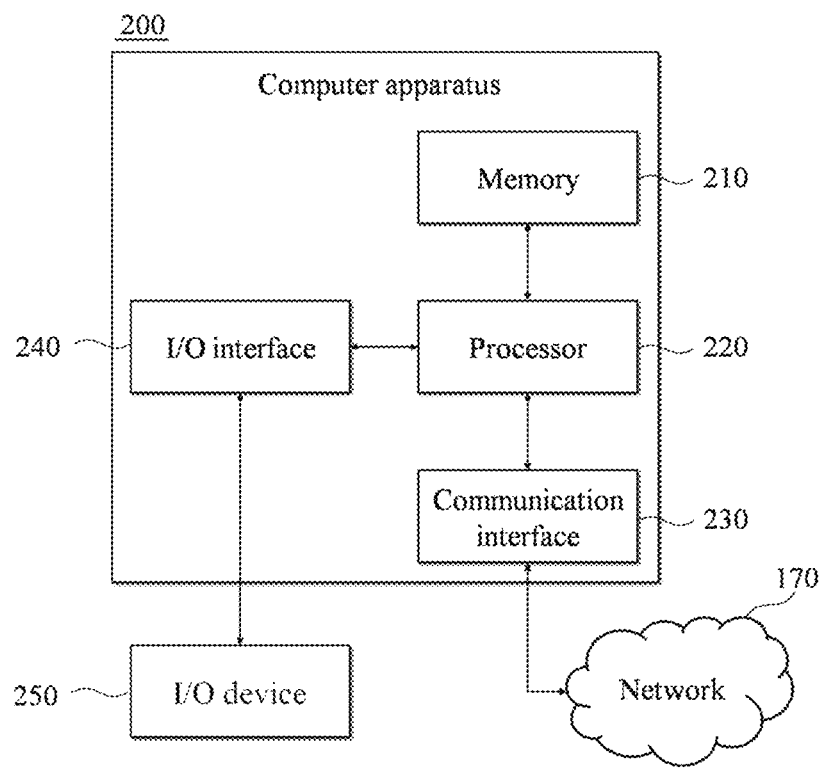
FIG. 2 is a block diagram illustrating an example of a computer apparatus according to an embodiment of the present disclosure.

FIG. 2 is a block diagram illustrating an example of a computer apparatus according to an embodiment of the present disclosure. Each of the plurality of electronic devices 110, 120, 130 and 140 or each of the servers 150 and 160 may be implemented by a computer apparatus 200 illustrated in FIG. 2.

As illustrated in FIG. 2, the computer apparatus 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer apparatus 200 as a permanent storage device separated from the memory 210. Furthermore, an operating system and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer apparatus 200 based on a computer program installed by files received over the network 170.

The processor 220 may be configured to process instructions of a computer program by performing default arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer apparatus 200 to communicate with other devices (e.g., the aforementioned storage devices) over the network 170. For example, a request, a command, data or a file generated by the processor 220 of the computer apparatus 200 based on program code stored in a recording device, such as the memory 210, may be provided to other devices over the network 170 under the control of the communication interface 230. Inversely, a signal, a command, data or a file from another device may be received by the computer apparatus 200 through the communication interface 230 of the computer apparatus 200 over the network 170. A signal, a command or data received through the communication interface 230 may be transmitted to the processor 220 or the memory 210. A file received through the communication interface 230 may be stored in a storage device (the aforementioned permanent storage device) which may be further included in the computer apparatus 200.

The I/O interface 240 may be means for an interface with an input/output (I/O) device 250. For example, the input device may include a device, such as a microphone, a keyboard or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer apparatus 200.

Furthermore, in other embodiments, the computer apparatus 200 may include elements greater or smaller than the elements of FIG. 2. However, it is not necessary to clearly illustrate most of conventional elements. For example, the computer apparatus 200 may be implemented to include at least some of the I/O device 250 or may further include other elements, such as a transceiver and a database.

Figure 3:
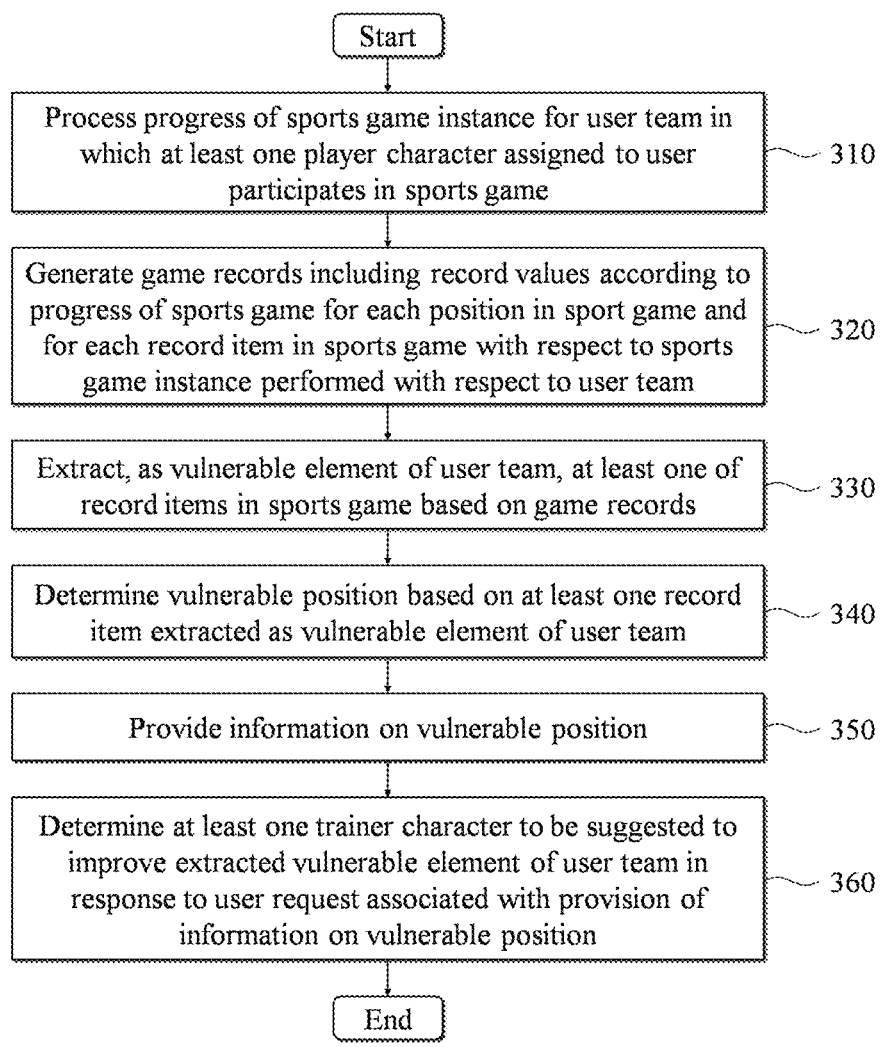
FIG. 3 is a flowchart illustrating an example of a method of managing a team according to an embodiment of the present disclosure.

FIG. 3 is a flowchart illustrating an example of a method of managing a team according to an embodiment of the present disclosure. The method of managing a team according to the present embodiment may be performed by the computer apparatus 200. In one embodiment, if a sports game is solely implemented in a user terminal, the computer apparatus 200 may correspond to the user terminal. In another embodiment, if a user terminal is provided with a sports game service through a server, the computer apparatus 200 may correspond to a server for providing a sports game service to the user terminal. In this case, the processor 220 of the computer apparatus 200 may be implemented to execute a control instruction based on a code of an operating system or a code of at least one computer program included in the memory 210. In this case, the processor 220 may control the computer apparatus 200 to perform steps 310 to 360 included in the method of FIG. 3 in response to the control instruction provided by the code stored in the computer apparatus 200. In one embodiment, if a sports game is solely implemented in a user terminal, a computer program may include a game app for a sports game. In another embodiment, if a user terminal is provided with a sports game service through a server, a computer program may include a code for providing a sports game service to the user terminal while operating in the server.

At step 310, the computer apparatus 200 may process the progress of a sports game instance for a user team in which at least one player character assigned to a user participates in a sports game. For example, in the case of a baseball game, a sports game instance for the baseball game may be performed between two of a plurality of teams included in the sports game. In one embodiment, the computer apparatus 200 may perform a sports game instance under the control of a computer program, such as an application for a sports game. In another embodiment, the computer apparatus 200 is a server for providing services for a corresponding sports game, and may process the progress of a sports game instance by providing a sports game service to at least one client device. In this case, player characters may mean characters assigned to a user for the progress of the sports game. For example, in a baseball game, baseball player characters belonging to the team of a user may be the player characters.

At step 320, the computer apparatus 200 may generate game records including record values according to the progress of the sports game for each position in the sport game and for each record item in the sports game with respect to the sports game instance performed with respect to the user team. For example, in the case of a baseball game, the positions may include a catcher (C), a first base man (1B), a second base man (2B), a third base man (3B), a short stop (SS), a left fielder (LF), a center field (CF), a right fielder (RF), and a pitcher (P). The pitcher may be subdivided into a starting pitcher (SP), a relief pitcher (RP), and a closing pitcher (CP). Furthermore, in the case of a batter, the record items may include a hit (HT), a home run (HR), a run batted in (RBI), a stolen base (SB), a good defense (GD), and a mistake (MS). In the case of a pitcher, the record items may include a lose point (LP), an allowed hit (AHT), an allowed home run (AHR), a strike out (SOT), and a four ball (FB). In other words, the computer apparatus 200 may generate game records that include, as record values, how many times has a situation corresponding to each of record items occurred in each position in a sports game instance.

At step 330, the computer apparatus 200 may extract, as a vulnerable element of the user team, at least one of the record items in the sports game based on the game records. For example, in the case of a baseball game, at least one of record items, such as the HT, the HR, the RBI, the SB, the GD, the MS, the LP, the AHT, the AHR, the SOT, and the FB, may be extracted as a vulnerable element.

As a more detailed example, the computer apparatus 200 may calculate an average record value for each record item based on the game records of N (N is a natural number) sports game instances recently performed by a user team. For example, assuming that a record value of a record item "strike out (SOT)" is {8, 7, 3} in 3 sports game instances that have recently been performed, an average record value may be calculated as 6 (=(8+7+3)/3). In this case, the computer apparatus 200 may calculate, for each record item, a ratio indicating that the calculated average record value belongs to a top few percent among all teams. For example, if an average record value of "hit (HT)" belongs to a top 10% all teams, the ratio may have a value of 10. The computer apparatus 200 may determine at least one record item as a vulnerable element of the user team based on a ratio calculated for each record item. For example, the computer apparatus 200 may determine that the fragility of a corresponding record item is higher as a value of a ratio is higher, and may extract, as vulnerable element of a user team, a record item having the highest fragility.

The record item may be divided into a positive element or a negative element depending on a type. For example, the hit (HT) may be classified as a positive element because it has a positive influence on team performance as the size of a record value is greater. The mistake (MS) may be classified as a negative element because it has a negative influence on team performance as the size of a record value is greater. Accordingly, the positive element and the negative element may have opposite meanings with respect to the ratio. Accordingly, a record item classified as a negative element may be determined to have high fragility as a value of the ratio is smaller. Alternatively, in order to apply the same method, the ratio of a record item classified as a negative element may be incorporated in the form of {100-ratio}. For example, if a ratio of the mistake (MS) classified as a negative element is calculated as 10, actual incorporation may have a form of 90 (=100-10).

At step 340, the computer apparatus 200 may determine a vulnerable position based on the at least one record item extracted as a vulnerable element of the user team. In this case, the computer apparatus 200 may check positions associated with the at least one record item extracted as a vulnerable element of the user team, and may select, as a vulnerable position, at least one of positions checked based on a record value of the at least one record item extracted as a vulnerable element of the user team. For example, in the case of a baseball game, if a strike out (SOT) among record items has been extracted as a vulnerable element of the user team, any one of a starting pitcher (SP), a relief pitcher (RP) or a closing pitcher (CP) may be determined as a vulnerable position based on such an SOT.

At step 350, the computer apparatus 200 may provide information on the vulnerable position. For example, the computer apparatus 200 may provide the user with information on a position having the lowest record as information on the vulnerable position. In this case, the user can take measures, such as that replacing the player character of the vulnerable position with another player character. In some embodiments, the computer apparatus 200 may further provide information on at least one record item extracted as a vulnerable element of the user team and information on positions associated with the at least one record item.

At step 360, the computer apparatus 200 may determine at least one trainer character to be suggested to improve the extracted vulnerable element of the user team in response to a user request associated with the provision of the information on the vulnerable position. In this case, the trainer character may be a character that participates in training for the promotion of a player character. The computer apparatus 200 may recommend, to the user, the determined trainer character as a scheme for improving the vulnerable element of the user team. The user can improve the vulnerable element of the user team through the promotion of the player character in which the recommended trainer character participates. In other words, an optimum trainer character can be recommended to the user in promoting the player character so that the user can improve the vulnerable element of the user team without being limited to simply notifying the user of the vulnerable position of the user team.

In one embodiment, the computer apparatus 200 may calculate a third correlation between the record items of a sports game and the items of a primary stat based on a first correlation between the record items of the sports game and the items of a secondary stat of player characters assigned to a user and a second correlation between the items of the secondary stat and the items of the primary stat of the player characters assigned to the user. For example, in a baseball game, the secondary stat may include the status of a player character associated with a game called "baseball", such as a hit increase, a home run long hit increase, or a home run increase. Furthermore, the primary stat may mean player character-unique status, such as intelligence, agility, or muscular strength. In this case, the second correlation may mean a correlation between the items of the secondary stat and the items of the primary stat.

Furthermore, the computer apparatus 200 may calculate a level of contribution of trainer characters assigned to a user to the items of a primary stat. For example, the computer apparatus 200 may calculate a level of contribution based on at least one of a status value of a trainer character, a coefficient preset with respect to the status of the trainer character, or an additional point based on whether a vulnerable position and the position of the trainer character are the same with respect to each of the trainer characters assigned to the user. A method of calculating the level of contribution is described more specifically later.

In this case, the computer apparatus 200 may select at least one trainer character that belongs to the trainer characters assigned to the user and that will be suggested for the improvement of a vulnerable element of a user team based on the calculated third correlation and the calculated level of contribution. The correlation may be a value for checking that it is effective to improve which item of the stat in order to supplement the vulnerable element. The level of contribution may be a value obtained by quantizing that a trainer character can effectively improve which item of the stat. Accordingly, the computer apparatus 200 may determine an item of the stat associated with a specific record item extracted as a vulnerable element based on the correlation, may determine a trainer character capable of most effectively improving the determined item of the stat based on the level of contribution, and may suggest the determined trainer character to the user.

FIG. 4 is a diagram illustrating an example of the game records of batters in a baseball game in an embodiment of the present disclosure. In FIG. 4, the game records 400 are the results of games of batters for N (N is a natural number) game instances recently performed by a user team in a baseball game, and illustrates record values generated with respect to a catcher (C), a first base man (1B), a second base man (2B), a third base man (3B), a short stop (SS), a left fielder (LF), a center field (CF), and a right fielder (RF), that is, the positions of batters, respectively, and a hit (HT), a home run (HR), a run batted in (RBI), a stolen base (SB), a good defense (GD), and a mistake (MS), that is, record items, respectively. For example, the game records 400 illustrate that 6 home runs (HR) occurred by the first base man (1B) while the user team performed the game instances. The game records 400 may be recorded in a form, such as {position (1B), type 1(HT), value1(91)}. This may mean that 91 hits occurred at the position of the first base man during the recent N games.

FIG. 5 is a diagram illustrating an example of the game records of pitchers in a baseball game in an embodiment of the present disclosure. In FIG. 5, the game records 500 are the results of games of pitchers for N game instances recently performed by a user team in a baseball game, and illustrates record values generated with respect to a starting pitcher (SP), a relief pitcher (RP), and a closing pitcher (CP), that is, the position of pitchers, respectively, and a lose point (LP), an allowed hit (AHT), an allowed home run (AHR), a strike out (SOT), and a four ball (FB), that is, record items, respectively. For example, the game records 500 illustrates that 10 lose points (LP) occurred by the starting pitcher (SP) while the user team performed the game instances.

In a baseball game, such game records 400 of FIG. 4 and game records 500 of FIG. 5 may be combined to become total game records of a user team. Game records may be separated as described above because the record items of the positions of batters and the record items of the positions of pitchers are different.

FIG. 6 is a diagram illustrating an example of statistical information of a batter in a baseball game in an embodiment of the present disclosure. In FIG. 6, the statistical information 600 illustrates the statistics of batters for N game instances recently performed by a user team in a baseball game. In the statistical information 600. A type may indicate the record items of a batter. A total may indicate the sum of record values for each type occurred at respective positions during the recent N games of the user team. For example, 471, that is, the sum of the record values of hits (HT), may be the sum of {98, 91, 47, 89, 53, 19, 46, 28}, that is, the record values of hits at respective positions in the game records 400 of FIG. 4. In the statistical information 600, the average may indicate an average record value obtained by dividing the sum of the record values by the number of games N. The ratio may indicate that an average record value belongs to a top few percent among all teams. For example, from the statistical information 600, it may be seen that the average record value 23.6 of the HT for the user team belongs to a top 18.5% among all teams. Such statistical information 600 may be recorded in a form, such as {type (HT), total (471), average (23.6), ratio (18.5)}.

FIG. 7 is a diagram illustrating an example of statistical information of a pitcher in a baseball game in an embodiment of the present disclosure. In FIG. 7, the statistical information 700 illustrates the statistics of pitchers for N game instances recently performed by a user team in a baseball game. A type, number, average, and ratio may be the same as those described in FIG. 6. For example, from the statistical information 700, it may be seen that the average record value 1.2 of the strike out (SOT) in the user team belongs to a top 99.0% among all teams.

FIG. 8 is a diagram illustrating an example of a process of extracting a vulnerable element in an embodiment of the present disclosure. In FIG. 8, a first table 810 illustrates a ratio and criterion for each of record items. In this case, the criterion indicates whether a corresponding record item is a positive (P) element or a negative (N) element. In this case, as described above, with respect to record items, that is, negative elements, a value of the ratio may be changed into a value of {100-ratio}. In FIG. 8, a second table 820 illustrates an example in which a value of the ratio has been changed into a value of {100-ratio} with respect to record items, that is, negative elements. It may be seen that all the record items, that is, negative elements, belong to a higher order as the value of the ratio is smaller because the value of the ratio has been changed into a value of {100-ratio} with respect to the record items. Accordingly, record items having higher fragility may be deployed in the higher order of the list by aligning higher ratio values in descending order. In FIG. 8, a third table 830 illustrates an example in which higher ratio values are aligned in descending order. In this case, it may be seen that an improvement is necessary for a higher order in the list (i.e., third table) because fragility is great. For example, the computer apparatus 200 may extract the SOT, that is, a record item positioned at the top of the third table 830, as a vulnerable element of the user team at step 330.

In some embodiments, vulnerable element extraction logic may be executed when the number of user teams that have recently performed N game instances or more (i.e., a total number of teams to be incorporated into the extraction of a vulnerable element) is R or more (R is a natural number of 2 or more). The reason for this is that when a total number of teams are too small, reliability in selecting a vulnerable element may be low. Such an N or R may be declared and controlled as a single parameter.

FIG. 9 is a diagram for describing an example of a process of determining a vulnerable position in an embodiment of the present disclosure. In order to determine a vulnerable position, the computer apparatus 200 may invoke information on a record item having the greatest fragility. For example, according to the embodiment of FIG. 8, information on the strike out (SOT) may be loaded onto the memory 210 of the computer apparatus 200. In this case, a record item, that is, a positive element, may become a vulnerable position if the record item has a lower record value. In contrast, a record item, that is, a negative element, may become a vulnerable position if the record item has a higher record value. In Table 900 of FIG. 9, since the SOT is a record item, that is, a positive element, a closing pitcher (CP) having the lowest record value may become a vulnerable position. A maximum of Q vulnerable positions (Q is a natural number) may be selected and suggested. A maximum number of suggestions Q may be declared and controlled as a single parameter.

Figure 10:
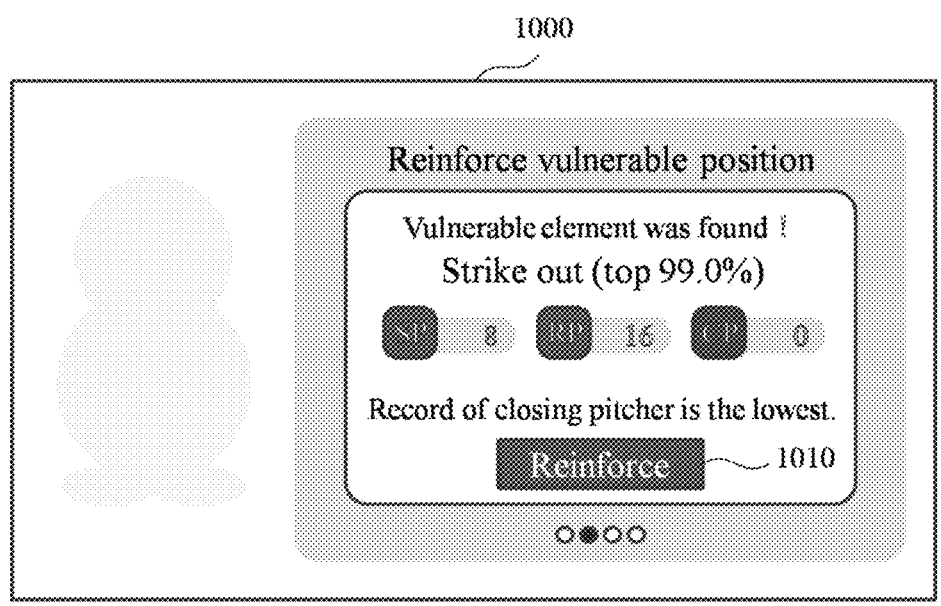
FIG. 10 is a diagram illustrating an example of information on a vulnerable position in an embodiment of the present disclosure.

FIG. 10 is a diagram illustrating an example of information on a vulnerable position in an embodiment of the present disclosure. FIG. 10 illustrates a screen implementation example 1000 in which a vulnerable position is suggested. Such a screen implementation example includes information on a record item (e.g., strike out (SOT)) that is a vulnerable element, information on positions (e.g., starting pitcher (SP), relief pitcher (RP) and closing pitcher (CP)) associated with the record item, and information on a vulnerable position (e.g., closing pitcher (CP)). Accordingly, a user can easily check a vulnerable position and vulnerable element of his or her team.

The computer apparatus 200 may further provide a function for reinforcing a vulnerable position while providing information on the vulnerable position. For example, in FIG. 10, when a "Reinforce" button 1010 is selected (e.g., when a user touches a region in which a "Reinforce" button 1010 has been displayed with a finger in a touch screen environment), improvement functions for improving a vulnerable position or vulnerable element may be provided to the user. Such improvement functions may include a function for replacing a player character or a function for promoting a player character.

In this case, in relation to the promotion of the player character, the computer apparatus 200 may select a trainer character that will participate in the promotion of the player character, and may suggest the selected trainer character to the user. For example, the computer apparatus 200 may automatically determine trainer characters most effective in overcoming a vulnerable element, and may recommend the determined trainer characters to the user.

FIG. 11 is a diagram illustrating an example of a first correlation between record items and the items of a secondary stat from a batter viewpoint in an embodiment of the present disclosure. In this case, in FIG. 11, Table 1100 illustrates the first correlation between the record items of a batter and the items of the secondary stat. For example, a value of a correlation between a "hit increase (ATG)" item and a record item "hit (HT)" among the items of the secondary stat may be "5". This may mean that as a value of the first correlation increases, a degree of mutual involvement between a corresponding record item and an item of the secondary stat increases.

FIG. 12 is a diagram illustrating an example of a first correlation between record items and the items of a secondary stat from a pitcher viewpoint in an embodiment of the present disclosure. In FIG. 12, Table 1200 illustrates the first correlation between the record items of a pitcher and the items of the secondary stat. For example, a value of a correlation between a "speed of a ball (GS)" item and a record item "lose point (LP)" among the items of the secondary stat may be "1". This may mean that as a value of the first correlation increases, a degree of mutual involvement between a corresponding record item and an item of the secondary stat increases.

FIG. 13 is a diagram illustrating an example of a second correlation between the items of a secondary stat and the items of a primary stat from a batter viewpoint in an embodiment of the present disclosure. In FIG. 13, Table 1300 illustrates the second correlation between the items of the secondary stat and the items of the primary stat for a batter. For example, a value of a correlation between the "intelligence (INT)" item of the primary stat and a hit increase (ATG)" item of the secondary stat may be "5". This may mean that as a value of the second correlation increases, a degree of mutual involvement between a corresponding item of the secondary stat and an item of the primary stat increases.

FIG. 14 is a diagram illustrating an example of a second correlation between the items of a secondary stat and the items of a primary stat from a pitcher viewpoint in an embodiment of the present disclosure. In FIG. 14, Table 1400 illustrates the second correlation between the items of the secondary stat and the items of the primary stat for a pitcher. For example, a value of a correlation between an "intelligence (INT)" item of the primary stat and a "speed of a ball (GS)" item of the secondary stat may be "5". This may mean that as a value of the second correlation increases, a degree of mutual involvement between a corresponding item of the secondary stat and an item of the primary stat increases.

FIG. 15 and FIG. 16 are diagrams illustrating an example of a third correlation between record items and the items of a primary stat in an embodiment of the present disclosure. The third correlation between the record items and the items of the primary stat may be calculated through matrix calculation. This may mean that as a value of the third correlation increases, a degree of mutual involvement between a record item and an item of the primary stat increases. For example, from FIG. 11, it may be seen that values of the respective items of the secondary stat for the record item "HT" are (5, 4, 3, 2, 1, 0, 0). Furthermore, from FIG. 13, it may be seen that values of the respective items of the secondary stat for the "intelligence (INT)" item of the primary stat are (5, 3, 0, 5, 5, 0, 0). In this case, the first table 1510 of FIG. 15 illustrating that a third correlation for a batter is calculated illustrates that a third correlation between the record item "HT" and the "intelligence (INT)" item of the primary stat is calculated as "52" (=5*5+4*3+3*0+2*5+1*5+0*0+0*0) through matrix calculation between (5, 4, 3, 2, 1, 0, 0) and (5, 3, 0, 5, 5, 0, 0). Likewise, a second table 1610 of FIG. 16 illustrates an example in which a third correlation for a pitcher is calculated.

In this case, in order to suggest at least one trainer character, the computer apparatus 200 may first group trainer characters assigned to a user for each position. Thereafter, the trainer characters for each position may be aligned in descending order based on a grade and level. In this case, the computer apparatus 200 may select trainer characters one by one from each group according to a rule (1) and a rule (2).

(1) Rule 1: when the number of trainer characters having a preset grade or more within a group is less than 1, a trainer character is selected based on the highest grade and/or level (2) Rule 2: when the number of trainer characters having a preset grade or more within a group is 1 or more, a trainer character that belongs to trainer characters having the preset grade or more and that has a level of contribution to a secondary stat increase most effective in the improvement of a vulnerable element is selected.

In this case, the computer apparatus 200 may deploy, in a deck for trainer characters, trainer characters that belong to trainer characters selected according to Rule 2 and that have higher values of a level of contribution to a secondary stat increase in higher order. If the deck is fully filled, logic may be terminated. For example, if 6 trainer characters can be deployed in the deck, trainer characters may be selected and deployed until the 6 trainer characters are fully deployed. If the deck is not fully filled, trainer characters may deployed in the deck based on a trainer character that belongs to trainer characters selected according to Rule 1 that has the highest grade and/or level.

In this case, a level of contribution to a primary stat increase (hereinafter referred to as a "level of contribution") may be calculated according to Equation 1.

Level of contribution=SIGMA (variable for each type*coefficient)+position matching bonus (K)  (1)

In this case, the variable for each type may mean a numerical value for each type of a corresponding trainer character. The type may correspond to a status item of the trainer character. Furthermore, the position matching bonus K may indicate an additional point given when a vulnerable position and a trainer position are the same. Such a K may be declared and controlled as a single variable.

FIG. 17 is a diagram illustrating an example of the status items of a trainer character in an embodiment of the present disclosure. In FIG. 17, Table 1700 illustrates the status items of a trainer character, that is, "muscular strength training deployment probability increase", "muscular strength training success rate increase", "agility training deployment probability increase", "agility success rate increase", "intelligence training deployment probability increase", "intelligence success rate increase", "mind training deployment probability increase", and "mind success rate increase." In this case, the "muscular strength training deployment probability increase" and "muscular strength training success rate increase" may be associated with the "muscular strength (STR)" item of the primary stat. Furthermore, the "agility training deployment probability increase" and "agility success rate increase" may be associated with the "agility (DEX)" item of the primary stat. Furthermore, the "intelligence training deployment probability increase" and "intelligence success rate increase" may be associated with the "intelligence (INT)" item of the primary stat. Furthermore, the "mind training deployment probability increase" and "mind success rate increase" may be associated with the "mind (MEN)" item of the primary stat. Table 1700 is an example of coefficient for respective status items, and illustrates values of "10". The values of the coefficients may be set in the respective status items, and do not need to have the same value.

For example, it is assumed that the status and coefficient of a trainer character A have values, such as those illustrated in Table 1.

TABLE 1

| type | value | coefficient |
| --- | --- | --- |
| Muscular strength training deployment probability increase | 20 | 9 |
| Muscular strength training success rate increase | 30 | 3 |
| Agility training deployment probability increase | 35 | 5 |
| Agility success rate increase | 27 | 2 |
| Intelligence training deployment probability increase | 15 | 7 |
| Intelligence success rate increase | 22 | 4 |
| Mind training deployment probability increase | 54 | 6 |
| Mind success rate increase | 37 | 8 |

In this case, levels of contribution for the primary stat of the trainer character A may be calculated as in Table 2 according to Equation 1. It is assumed to that a value of the position matching bonus K is 0.

TABLE 2

| primary stat | level of contribution | calculation |
| --- | --- | --- |
| Muscular strength | 270 | 20*9 + 30*3 |
| Agility | 229 | 35*5 + 27*2 |
| Intelligence | 193 | 15*7 + 22*4 |
| Mind | 620 | 54*6 + 37*8 |

Accordingly, it may be seen that the trainer character A has the highest level of contribution to the "mind" item of the primary stat.

For example, a case where a record item "mistake" has been extracted as a vulnerable element. According to the embodiment of FIG. 15, an item of the primary stat having the highest correlation with the record item "mistake" is the "mind" item. In this case, the computer apparatus 200 may check a level of contribution to the "mind" item of the primary stat for each of trainer characters assigned to a user, and may suggest, to the user, a trainer character having the highest level of contribution to the "mind" item of the primary stat in order to improve the record item "mistake" extracted as a vulnerable element.

As described above, the correlation may be a value for checking that it is effective to improve which item of a stat in order to supplement a vulnerable element. The level of contribution may be a value obtained by quantizing how a trainer character can effectively improve which item of a stat. Accordingly, the computer apparatus 200 may determine an item of a stat, associated with a specific record item extracted as a vulnerable element, based on a correlation, may determine a trainer character capable of most effectively improving the item of the stat determined based on a level of contribution, and may suggest the determined trainer character to a user.

As described above, according to embodiments of the present disclosure, a vulnerable position can be determined by analyzing user data for a sports game, and a suggestion can be made to a user. At least one trainer effective in overcoming a vulnerable element may be determined and suggested to a user.

The aforementioned system or apparatus may be implemented in the form of a hardware element or a combination of a hardware element and a software element. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of managing a team, which is performed by a computer apparatus comprising at least one processor, the method comprising:
    performing, by the at least one processor, a sports game instance for a user team in which player characters assigned to a user participate in a sports game under the control of a computer program or as a sports game service;
    processing, by the at least one processor, a progress of the sports game instance;
    generating, by the at least one processor, a game record comprising record values according to the progress of the sports game instance for each position in the sports game and for each record item in the sports game with respect to the sports game instance performed on the user team;
    extracting, by the at least one processor, at least one of the record items of the sports game as a vulnerable element of the user team based on the game record;
    determining, by the at least one processor, a vulnerable position based on the at least one record item extracted as the vulnerable element of the user team;
    providing a first user interface for displaying information on the vulnerable position and a second user interface for requesting an improvement to the vulnerable element;
    providing, by the at least one processor, the information on the vulnerable position through the first user interface;
    improving, by the at least one processor, the vulnerable element in response to receiving a request via the second user interface; and
    performing, by the at least one processor, a second sports game instance for the user team using the improved vulnerable element;
    wherein each of the player characters has a primary stat including primary stat items and a secondary stat including secondary stat items;
    wherein one or more trainer characters for improving the primary stat items are assigned to the user; and
    wherein the method further comprises:
        determining, by the at least one processor, at least one trainer character among the trainer characters to be suggested to improve the extracted vulnerable element in response to a user request being received through the second user interface; and
    wherein determining the at least one trainer character comprises:
        calculating, based on a first correlation between the record items of the sports game and the secondary stat items and a second correlation between the secondary stat items and the primary stat items, a third correlation between the record items of the sports game and the primary stat items;
        calculating a level of contribution to the improvement of the primary stat items by the trainer characters; and
        selecting at least one trainer character among the trainer characters to be suggested to improve the vulnerable element of the user team based on the calculated third correlation and the calculated level of contribution.

2. The method of claim 1, wherein extracting the at least one record item as the vulnerable element of the user team comprises:
    calculating an average record value for each record item based on game records for N sports game instances (N is a natural number) recently performed by the user team;
    calculating, for each record item, a ratio indicating that the calculated average record value belongs to a top few percent among all teams; and
    determining at least one record item as the vulnerable element of the user team based on the ratio calculated for each record item.

3. The method of claim 1, wherein determining the vulnerable position comprises:
    checking positions associated with the at least one record item extracted as the vulnerable element of the user team; and selecting, as the vulnerable position, at least one of the checked positions based on a record value of the at least one record item extracted as the vulnerable element of the user team.

4. The method of claim 1, wherein providing the information on the vulnerable position further comprises providing information on the at least one record item extracted as the vulnerable element of the user team and information on positions associated with the at least one record item.

5. The method of claim 1, wherein calculating the level of contribution comprises calculating the level of contribution based on at least one of a status value of each of the trainer characters, a coefficient preset associated with the status value, and an additional point assigned to a trainer character among the trainer characters whose position is the same as the vulnerable position.

6. A non-transitory processor-readable medium having instructions stored thereon, which when executed by one or more processors, cause the one or more processors to implement a method according to claim 1.

7. A computer apparatus comprising at least one processor implemented to execute instructions readable by a computer, wherein the at least one processor is configured to:
perform a sports game instance for a user team in which at least one player character assigned to a user participates in a sports game under the control of a computer program or as a sports game service;
process a progress of the sports game instance;
generate a game record comprising record values according to the progress of the sports game instance for each position in the sports game and for each record item in the sports game with respect to the sports game instance performed on the user team;
extract at least one of the record items of the sports game as a vulnerable element of the user team based on the game record;
determine a vulnerable position based on the at least one record item extracted as the vulnerable element of the user team;
provide a first user interface for displaying information on the vulnerable position and a second user interface for requesting an improvement to the vulnerable element;
provide the information on the vulnerable position through the first user interface;
improve the vulnerable element in response to receiving a request via the second user interface; and
perform a second sports game instance for the user team using the improved vulnerable element;
wherein each of the player characters has a primary stat including primary stat items and a secondary stat including secondary stat items;
wherein one or more trainer characters for improving the primary stat items are assigned to the user; and
wherein the at least one processor is further configured to:
determine at least one trainer character among the trainer characters to be suggested to improve the extracted vulnerable element in response to a user request being received through the second user interface;
calculate, based on a first correlation between the record items of the sports game and the secondary stat items and a second correlation between the secondary stat items and the primary stat items, a third correlation between the record items of the sports game and the primary stat items;
calculate a level of contribution to the improvement of the primary stat items by the trainer characters; and
select at least one trainer character among the trainer characters to be suggested to improve the vulnerable element of the user team based on the calculated third correlation and the calculated level of contribution.

* * * * *